Figure 1:
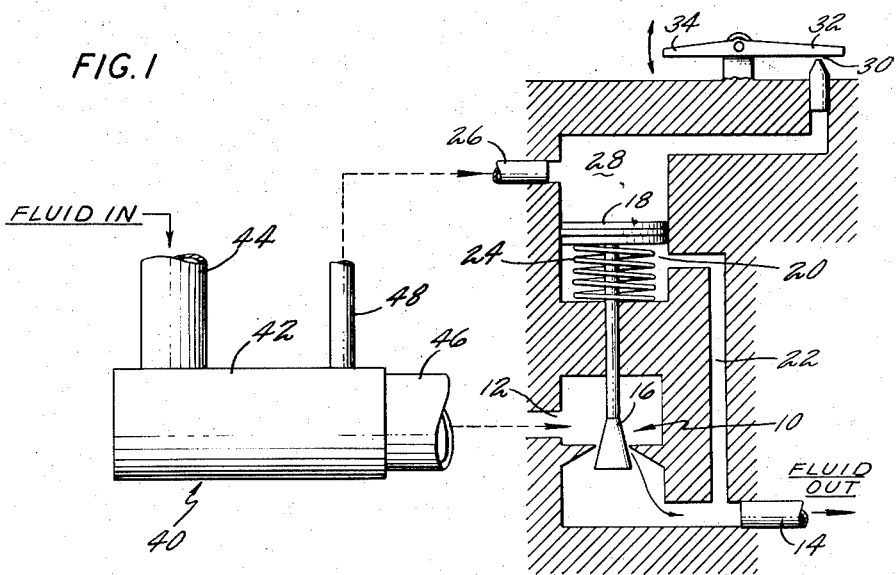

Jan. 13, 1959

S. G. BEST 2,868,382

FILTER DEVICE WITH COARSE FILTER
AND SELF-CLEANING FINE FILTER

Filed Sept. 21, 1956

INVENTOR
STANLEY G. BEST
BY Leonard F. Wiklind
ATTORNEY ns Patent Office  
2,868,382  
Patented Jan. 13, 1959

---

2,868,382

FILTER DEVICE WITH COARSE FILTER AND SELF-CLEANING FINE FILTER

Stanley G. Best, Manchester, Conn., assignor to United Aircraft Corporation, East Hartford, Conn., a corporation of Delaware Application September 21, 1956, Serial No. 611,134

2 Claims. (Cl. 210—295)

This invention relates to filtering devices and more particularly to filters for fluids operating highly sensitive servo devices.

It is an object of this invention to provide a filtering unit for a fluid flow system containing relatively large and small orifices.

It is a further object of this invention to provide some filtering of the fluid for the larger orifices while providing very fine filtering for the relatively small orifices.

It is a still further object of this invention to provide a self-cleaning feature to the fine filtering element of this device.

Figure 2:
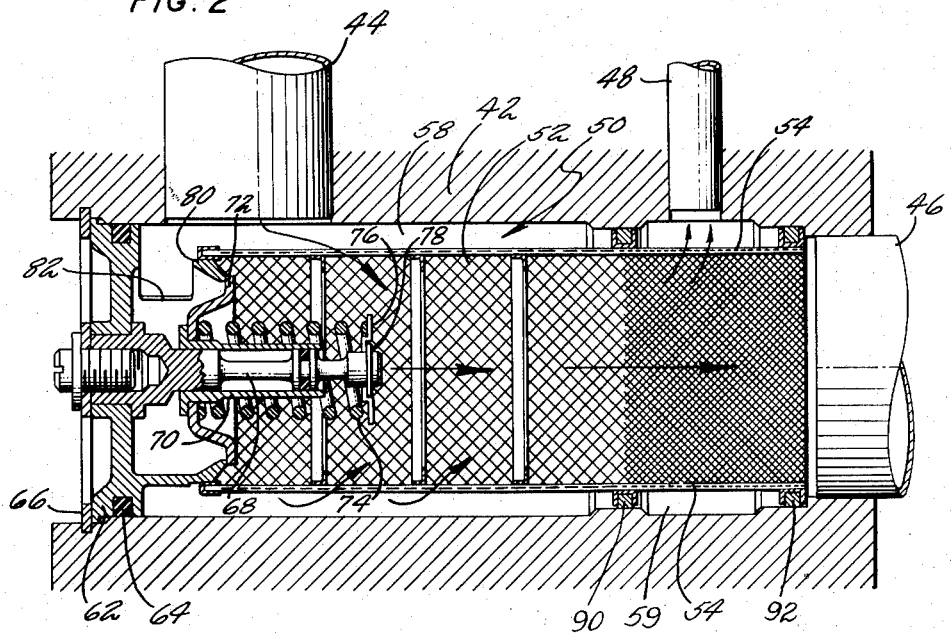

These and other objects of this invention will become readily apparent from the following detailed description of the drawing in which:

Fig. 1 is a schematic illustration in partial cross section of a fluid flow system having the filtering device of this invention, and Fig. 2 is an enlarged detailed cross-sectional view of the filter device.

Referring to Fig. 1, a throttle valve or variable area orifice is generally indicated at 10. Fluid flows into the chamber 12, is metered by the valve 10, and flows out to a fluid consuming device via the line 14. The main stem 16 of the valve 10 may be controlled by a spring loaded servo piston 18. The chamber 20 on the bottom side of the piston 18 receives fluid from the downstream side of the throttle valve 10 via a line 22. The pressure in the chamber 20 and the spring 24 urge the piston in an upward direction. Fluid under relatively high pressure is fed via the line 26 to the chamber 28 on the top side of the piston 18. Fluid is bled from the chamber 28 by means of a variable area orifice 30 which is controlled by a flap or arm 32 and moved at its left end 34 by any suitable means. This type of servo control is more clearly illustrated and described in patent application Serial No. 528,879 filed August 17, 1955, by Thomas P. Farkas.

The fluid flowing through the variable area orifice of the throttle valve 10 is preferably filtered at least somewhat commensurate with the range of opening thereof during normal operation. On the other hand, the servo controlling variable area orifice 30 is much smaller than the opening of the throttle valve; and therefore, any fluid being fed thereto must be finely filtered to eliminate even the finest particles of foreign matter therein to prevent clogging.

To this end a filter generally at 40 is illustrated in Fig. 1. The filter has a main body 42 and a main inlet 44. A large outlet 46 is provided as well as an outlet 48 leading to the servo system. It is desirable, therefore, that the fluid passing through the outlet passage 48 be more highly filtered than the fluid passing through the outlet 46 as a result of the difference in size of the orifices which are receiving the fluids from these two outlets.

Referring to Fig. 2 the filter body 42 is shown as having a readily disposed inlet 44. The casing for body 42 contains a cylindrical filtering screen 50 which has a relatively coarse portion 52 and a relatively fine filtering portion 54. Fluid from the inlet 44 flows through the annular chamber 58, passes through the coarse portion 52 of the screen, and then flows axially and centrally of the hollow screen element. Thus, all of the fluid passes through the coarse screen portion 52. A majority of the fluid then flows axially of the filter device and out through the downstream main outlet 46.

A relatively smaller portion of the fluid flows radially outwardly through the relatively fine screen portion 54, through chamber 59 and then out through the radial outlet 48. Thus, the fluid passing through the relatively fine screen portion 54 will be filtered a second time and through a much finer filter element. Thus, the fluid flowing radially outwardly through the outlet 48 will be comparatively free of even fine foreign matter. The inside surface of the screen portion 54 will be continuously scrubbed by the high velocity and larger volume of flow which is passing axially of the filter device and out through the main axial outlet 46. Thus, any fine particles which are deposited on the inner surface of the screen portion 54 will tend to be dislodged therefrom and passed downstream out through the outlet 46. This type of construction provides a self-scrubbing or self-cleaning fine filter element.

The left end of the filter device in Fig. 2 has a sealing cap 62 including a piston-type seal 64. A suitable flap ring 66 is provided for holding the cap 62 in place. The cap 62 carries a pintle-like member 68 which in turn carries a sleeve 70. A disc-like member 72 is slidably mounted on the sleeve 70 and is held in the position shown by a suitable spring 74. The right-hand end of the spring 74 sits against a stop 76 held in position by a suitable U-shaped clamp 78 which sits in a groove in the right-hand end of the pintle 68.

The disc-like member 72 is adapted to sealingly engage a lip 80 carried by a depending flange 82 carried by the cap 62.

Should the coarse portion 52 of the screen 50 become excessively clogged, the pressure drop thereacross will increase considerably. With an excessive increase in pressure drop, the fluid will force the disc-like member 72 to the right, thereby bypassing the coarse screen element 58 and permitting fluid to flow directly through the center of the screen out through the outlet 46.

At the point of juncture of the coarse and fine filters 52, 54 a seal or spring-like ring 90 is provided to seal off the space between the filters and the outer casing wall. This forms a wall defining the chambers 58 and 59. A second seal 92 forms the downstream wall for the chamber 59 which in turn communicates with the passage 48.

It will be apparent that as a result of this invention a highly practical, efficient, and simple filtering device has been provided for a fluid flow system including means providing two degrees of filtering. Furthermore, at least a portion of the filtering device is provided with a soft scrubbing action to prevent clogging thereof.

Although only one embodiment of this invention has been illustrated and described herein, it will be apparent that various changes and modifications may be made in the construction and arrangement of the various parts without departing from the scope of this novel concept.

What it is desired by Letters Patent is:

1. A filtering device for a liquid, a casing forming an outer wall, a relatively coarse filtering member in said casing wall and spaced from the wall thereof thereby forming a chamber therebetween, an inlet at one end of said casing leading to said chamber, the flow of liquid being from said inlet to said chamber through said filtering member and axially along the device inside said filtering member, a seal between said member and said casing wall and forming an end wall at the downstream end of said coarse filtering member, a relatively fine filter element downstream of said coarse filtering member, an outlet in said casing at the downstream end of the fine filter, said fine filter having a central passage for receiving the flow axially discharged from the interior of said coarse filtering member and axially discharging through said outlet a major portion of the flow received from said coarse filter whereby the inside of said fine filter is continuously scrubbed, a second outlet in said casing and receiving a minor flow radially outwardly from said fine filter element.

2. A filtering device having an elongated cylindrical casing forming an outer wall of an annular flow chamber, a wall at the upstream end of said casing, a radially extending inlet opening in said casing adjacent said upstream end wall, said casing being open at its downstream end forming an axial outlet, a tubular substantially coarse filter member in said casing and spaced from said outer wall forming the inner wall of said flow chamber, fluid entering said inlet passing radially inwardly from said flow chamber through said coarse filter member and axially along the inside of said coarse filter member, a second tubular and relatively fine filter element located downstream of said coarse filter member and spaced inwardly from said outer casing wall thereby forming the inner wall of a second chamber located downstream of said first-mentioned flow chamber, said fine filter having a central passage for receiving the flow axially discharged from the interior of said coarse filter member and axially discharging a major portion of the flow received therefrom, a radially extending outlet in said casing adjacent the downstream end thereof and leading from said second chamber, said second filter passing a minor portion of said flow to said second chamber and out said radially extending outlet.

References Cited in the file of this patent

UNITED STATES PATENTS

| 2,748,949 | James | June 5, 1956 |
| 2,751,253 | Purchas et al. | June 19, 1956 |

FOREIGN PATENTS

| 118,713 | Australia | July 17, 1942 |